United States Patent

Monett

[15] 3,674,930

[45] July 4, 1972

[54] VIDEO POINTER

[72] Inventor: Michael R. Monett, Somerville, Mass.

[73] Assignee: Massachusetts Institute of Technology, Cambridge, Mass.

[22] Filed: Oct. 2, 1969

[21] Appl. No.: 863,154

[52] U.S. Cl. ....................178/7.5 R, 178/DIG. 4, 178/DIG. 6, 328/187

[51] Int. Cl. ..............................................................H04m 5/44

[58] Field of Search ....................178/DIG. 4, DIG. 6, DIG. 1, 178/6.8, 7.5 R; 328/186, 7, 8, 9; 35/7, 8; 315/26

[56] References Cited

UNITED STATES PATENTS

| | | | |
|---|---|---|---|
| 2,595,646 | 5/1952 | Doba, Jr. et al. | 328/187 |
| 2,621,246 | 12/1952 | Glayden et al. | 178/6 |
| 2,784,247 | 3/1957 | Hurford | 178/6 |
| 3,179,744 | 4/1965 | Myles | 178/6 |

*Primary Examiner*—Richard Murray
*Assistant Examiner*—Peter M. Pecori
*Attorney*—Thomas Cooch, Martin M. Santa and Lawrence Gilbert

[57] ABSTRACT

A line or rectangle is superimposed on a video picture to direct attention to features of the picture and to indicate heights and angles of lines in the picture. Video signals are sampled to provide synchronizing triggers to timing circuits. Four timing circuits define the vertical position and height, and horizontal position and width of the rectangle or line. One additional timing circuit defines the angle the line makes with the vertical, permitting slanted lines or diamond shapes. The pulses which form the line, rectangle or diamond shape are fed back to the video system on the same cable which brought the composite signal to the hand-held video pointer circuitry.

8 Claims, 4 Drawing Figures

INVENTOR:
MICHAEL R. MONETT
BY Laurence Gilbert
ATTORNEY

INVENTOR:
MICHAEL R. MONETT
BY Laurence Gilbert
ATTORNEY

INVENTOR:
MICHAEL R. MONETT
BY Laurence Gilbert
ATTORNEY

VIDEO POINTER

BACKGROUND OF INVENTION

1. Field

The present invention relates to special effect electronic generators and in particular to video pointers superimposed on a TV monitor.

2. Description of the Prior Art

Electronic pointers are used in closed-circuit TV as an educational aid in describing what is seen on the monitor. These pointers use a two cable system to communicate between the pointer and the monitor and camera with a resultant loss of the video signal on the monitor if the pointer fails or is inadvertently turned off. High power requirements have prevented design of a unit that could be held in the palm of the hand. In addition, these pointers are somewhat limited because they do not make an angle with respect to the vertical which would allow provision for a diamond shape or a simulated physical pointer. Previous devices have been limited to functions with vertical or horizontal components only. Squares, crosses, lines or boxes have been variable in size, but have always been vertical.

SUMMARY

It is an object of the invention to generate a line or rectangle, that is superimposed on a TV monitor.

It is a further object of the invention to generate an angle with respect to the vertical to produce a diamond shape or to simulate a physical pointer by means of a slanted line.

It is a further object of this invention to provide low power drain circuitry, which allows the invention to be hand-held.

It is a further object of this invention to connect the video pointer to the video system by means of only one cable, permitting greater mobility for the user and preventing loss of the video signal on the monitor if the pointer fails or is turned off.

It is a further object of this invention to provide a controlled ramp output pulse to minimized disturbances to the video system when a single cable is used.

It is a further object of the invention to operate it with low power consumption permitting the use of batteries.

The objects are accomplished by generating timing pulses that determine the start of each line, and the beginning and end of each frame, selecting any one of said line start pulses generated after the first line start pulse, gating a pre-determined number of pulses generated after said selected line start pulse, delaying said gating means for a variable period of time corresponding to a segment of a line, developing a ramp having a controlled rate on the trailing edge of said terminating means, and feeding back said terminating means to the video picture to form a slanted line or rectangle thereon.

Other objects and a fuller understanding of the invention may be had by referring to the following description and claims taken in conjunction with the accompanying drawing.

DESCRIPTION OF THE PREFERRED EMBODIMENT

In the conventional television system, a scene to be transmitted is cut into a series of horizontal strips or lines, which are assembled at the monitor in their original relationship. A line is defined as a thin horizontal segment of a picture when viewed on the monitor. Each line conveys a small portion of the image, and some 525 are required to complete a picture, or frame. A frame is comprised of the number of lines used to make up the picture. One frame is transmitted in one-sixtieth second, or 16.6 milliseconds, and one line occupies approximately 63.5 microseconds.

As the sequence of lines is transmitted one after the other, locating any point of the picture involves determining how long after the start of the frame the line will be transmitted, to define the vertical position; and how long after the start of the line, to define the horizontal position. On the monitor, the picture is scanned from top to bottom and from left to right.

The conventional television system provides synchronizing pulses at the end of each line and at the end of each frame to control the oscillators in the monitor which sweep the electron beam across the face of the picture tube. In order to generate a series of pulses which would form a line or dot on the screen, it is necessary to extract the sync pulses from the composite signal and use them to control the timing circuits in the video pointer. The end of each frame is indicated by an absence of horizontal sync pulses or the equivalent.

Figure 1:
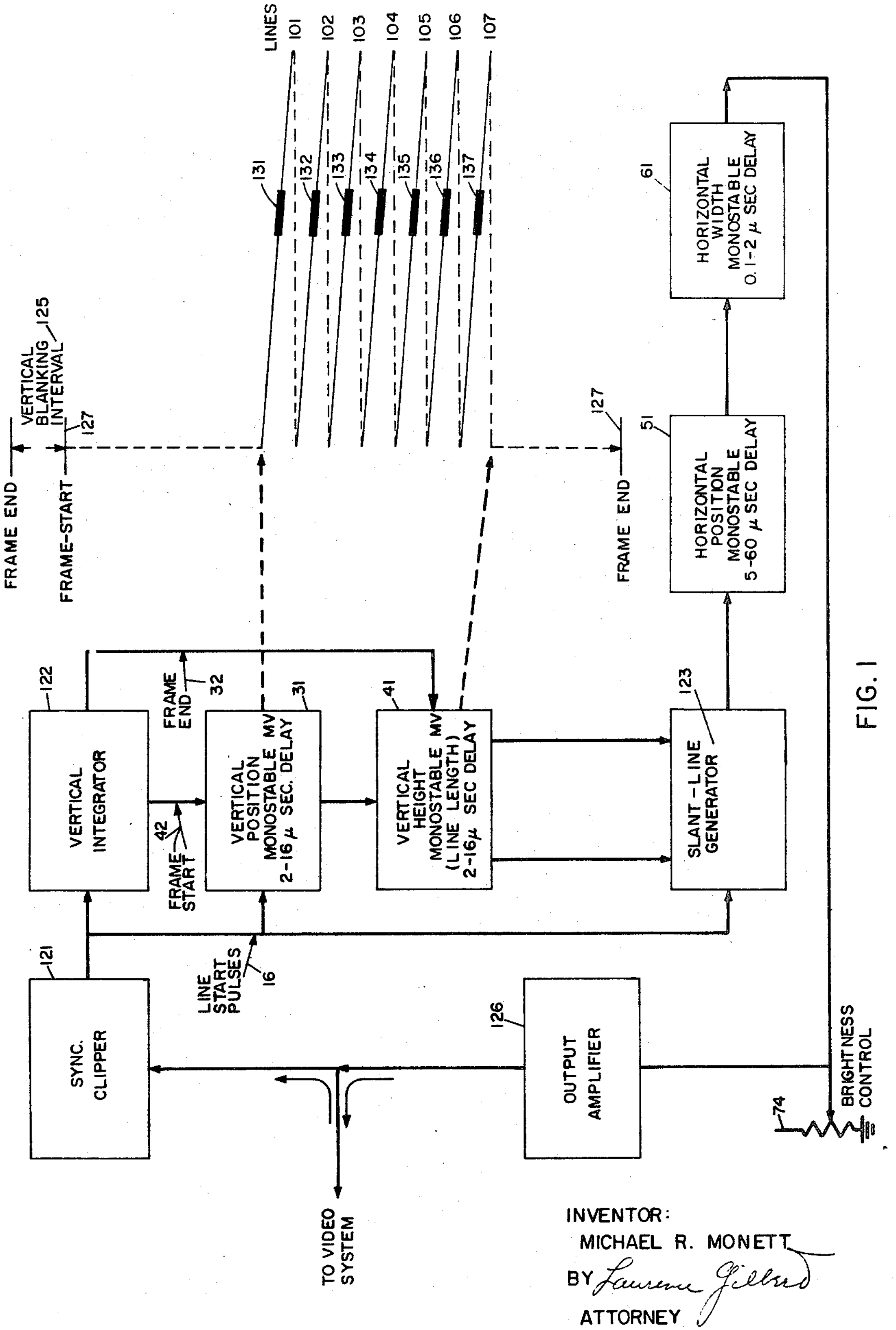
FIG. 1 is a block diagram of the video pointer showing how sync pulses generated in a video camera are used to super-impose a vertical line segment.

Referring to FIG. 1, the block diagram of the video pointer is comprised of sync clipper 121 and vertical integrator 122, vertical position and height monostable flip-flop circuits 31 and 41, slant line generator 123 and horizontal gate circuit 109, horizontal position and width monostable flip-flop circuits 54 and 64, and output amplifier 126. Component values are chosen to minimize power drain and to permit operation at low battery voltages.

SYNC CLIPPER AND VERTICAL INTEGRATOR

The sync clipper 121 uses horizontal sync pulses from the composite signal of a video camera or monitor to form sharp positive triggers that signal the start of each line of the composite signal. Line start pulses 16 synchronize the slant line generator 123 with the oscillator of the TV monitor and camera. A selected line start pulse is used to change the state of the vertical position monostable flip-flop circuit 31. A monostable flip-flop circuit is defined as a circuit which, when triggered, will change to a known state for a predetermined but variable period of time, then revert spontaneously to its original state. The outputs of the vertical integrator 122 signal the beginning and end of each frame 126. The frame start pulse 42 triggers the vertical position monostable circuit 31 ensuring that its delay period begins at the start of the frame; the line start pulse forces the vertical position monostable to return to its original state at the beginning of some selected line after the delay determined by vertical position delay control 34. The end-of-frame signal 32 terminates the vertical height monostable circuit 41 if not already terminated. The integrator circuit that signals the end of the frame reacts in much less time than the 63.5 microseconds required for one horizontal line scan. This ensures the termination of a line which may otherwise continue through the blanking period and extend down from the top of the picture.

Since the transistors in the sync clipper and vertical integrator are nonconducting most of the time, the average current required is very low.

VERTICAL POSITION AND HEIGHT

The vertical position monostable circuit 31 uses the frame start pulse and line start pulse to generate a trigger pulse at the start of some line selected by vertical position control 34. The line start pulses determine the exact point at which the vertical position delay period terminates. This ensures that the vertical height monostable circuit 41 will be triggered by the trigger pulse from monostable circuit 31 at the same point on successive frames to eliminate a sideways jitter in the position of the line as the vertical position is changed. Vertical height control 44 determines the height of the line when vertical, the initial point of which is determined by the vertical position delay control. The vertical height monostable circuit produces the control voltages for the clamping circuits which control the flow of horizontal sync pulses to the slant line generator and to the horizontal position monostable; and controls the amount of capacitance in the oscillator circuit required to determine the angle of the line to be generated.

The state of the vertical height monostable circuit provides the proper input signals to the gating circuits of slant-line generator 123 such that when a line is being generated pulses are fed to horizontal position monostable circuit 51 at a rate determined by the slant line control 84.

The vertical height monostable circuit is positively terminated at the end of each frame by the end-of-frame signal to prevent interference with the blanking interval 125.

SLANT LINE GENERATOR AND HORIZONTAL GATE CIRCUIT

The slant line generator 123 generates a series of pulses at approximately the horizontal line frequency which can be delayed or advanced in small increments each line to provide a variable slant feature.

The oscillating frequency in the horizontal gate circuit of generator 123 can be offset from the frequency of the oscillator in the TV monitor and camera. When a line is being generated, the offset oscillator runs at a frequency determined by the slant line control. Hence, the initial pulse that triggers horizontal position monostable 51 is at the frequency of the oscillator in the TV monitor, but all succeeding pulses to the horizontal position monostable 51 are determined by the position of the slant line control 84. Otherwise, the offset oscillator is locked to the reference oscillator in the TV monitor and camera. Since the offset oscillator is always running, transients are reduced.

The offset oscillator chosen must satisfy a number of difficult requirements simultaneously. It must have a good short-term frequency stability, yet it must be variable over a small range. It must not draw large amounts of power, yet it must operate at a low voltage which may vary according to the state of the batteries. It must be capable of locking to an external signal quickly, yet it should show a minimum of dynamic transients between the locked and unlocked condition. Finally, it should provide a convenient trigger takeoff point which requires a minimum of further processing, and which is fairly stable with variations in battery voltage or transistors. A tuned-collector LC oscillator proved ideal for the first eight conditions, and careful attention to the size of the bypass capacitor in the base circuit put a spike in the peak of the base waveform which was used to satisfy the last. Further, a simple balancing operation with capacitors 83 and 84 will put this spike in exact synchronism with the original horizontal sync pulse and completely eliminate switching transients. It also permits the entire slant line circuit to be removed in models which do not require this feature. Bypassing this feature may be desirable when the device is used in systems which do not exhibit good short-term stability, such as video tape recorders and some types of cameras. A simple switching network can be used to inhibit undesired functions to provide this added flexibility.

HORIZONTAL POSITION AND WIDTH

The horizontal position monostable 51 provides a variable delay to position the line across the screen of the monitor. It is first triggered at the leading edge of the horizontal synchronizing pulse from the TV monitor, succeeding points being determined by the slant line control. The horizontal position control 54 determines the horizontal position of the line. If the line is to be placed at the far right of the picture, monostable circuit 51 must recover in about 8 microseconds. Yet the horizontal position control must deliver enough current to the stable side of monostable circuit 51 to reduce interaction with monostable circuit 61. This limits the maximum resistance in the base circuit, which in turn reflects on the minimum recovery time obtainable. A solution would be an extra transistor connected as an emitter follower to isolate monostable circuits 51 and 61, but as a number of conditions have to be met (i.e., operation at extreme right of picture with low battery voltage) the circuit was left as is to provide a quick indication of the condition of the batteries. If they are low, the top pulse on the picture will be displaced further to the right than usual.

The horizontal width monostable circuit 61 determines the width of the displayed line. Recognizing that the vertical circuits must operate each frame, but that the horizontal circuits may not have to operate each line, permits a saving in power consumption by leaving the horizontal monostable circuits 51 and 61 in the standby condition until they are required.

The monostable circuit 61 must also deliver power at a low impedance to drive the output amplifier 126. Combining the functions of timing and power amplification simplifies the circuit and gives the unusual condition that the standby power drain is essentially zero. This is important because it represents a possible savings of 3 ma of constant current requirement, which is half the nominal 6 ma drain for the entire circuit.

The power amplifier in monostable circuit 61 is designed such that it turns off at a controlled rate. The slope of this trailing ramp is important in permitting a smooth transition which helps the video amplifier in the camera to recover from overload.

OUTPUT AMPLIFIER

Output amplifier 126 controls the height or amplitude of the pulse inserted with the composite signal to determine the brightness of the spot at the required point on the screen.

Brightness control 74, which sets the brightness level of the generated line, rectangle, or diamond, provides the input to output amplifier 126. The output pulse of amplifier 126 is fed back on the same cable which brought the composite signal to the video pointer circuit. In order to use a single cable between the device and the rest of the video system, the shape of the pulse should be carefully controlled. Initially, a large surge of current is required to charge the cable capacitance, but it must come from a voltage source to prevent a large spike which could cause ringing and echoes on the monitor. As the height of the pulse determines the brightness of the displayed line or rectangle, it should be constant over the duration of the pulse. Because the pulse also appears at the output of the video amplifier in the camera, this amplifier will tend to overload. Thus, the trailing edge of the pulse must be comparatively slow to provide a smooth transition while the video amplifier recovers, and to minimize ringing on the connecting cables. Ideally, this transition will be independent of the particular position of the control which determines the brightness of the line. Thus, the output of the power amplifier in monostable circuit 61 is particularly valuable. Its controlled rate output can be adjusted by adjusting the values of the resistors in the base of the power amplifier, thereby minimizing the problem of recovery of the system for any required brightness of the display.

The emitter-follower amplifier, 126, retains the pulse shape fed to the system. It also eliminates loading of the video signal because positive-going video drives it further into cutoff, and the negative-going sync pulses are not large enough to drive it into conduction. The emitter resistor provides a slight damping to reduce ringing on the trailing edge of the pulse.

LINE PATTERN

Pulses 131 through 137 generate a vertical line segment as follows: Frame start pulse triggers vertical position monostable circuit 31 and is delayed by the vertical position delay until line one hundred one. The vertical position delay is selected such that line start pulse one hundred terminates the vertical position monostable circuit thereby triggering the vertical height monostable circuit. The vertical height delay allows seven pulses to be gated from the slant line generator to the horizontal position monostable after which successive pulses are clamped to ground. Horizontal position control delays the pulses until about the mid-point of the picture and horizontal width delay determines the length of the pulse. With the angle or slant line control in the zero offset position, each pulse will be generated at the same point in time with respect to the line start pulses to make a vertical line segment as shown by pulses 131 to 147.

CONSTRUCTION

Figures 2, 4:
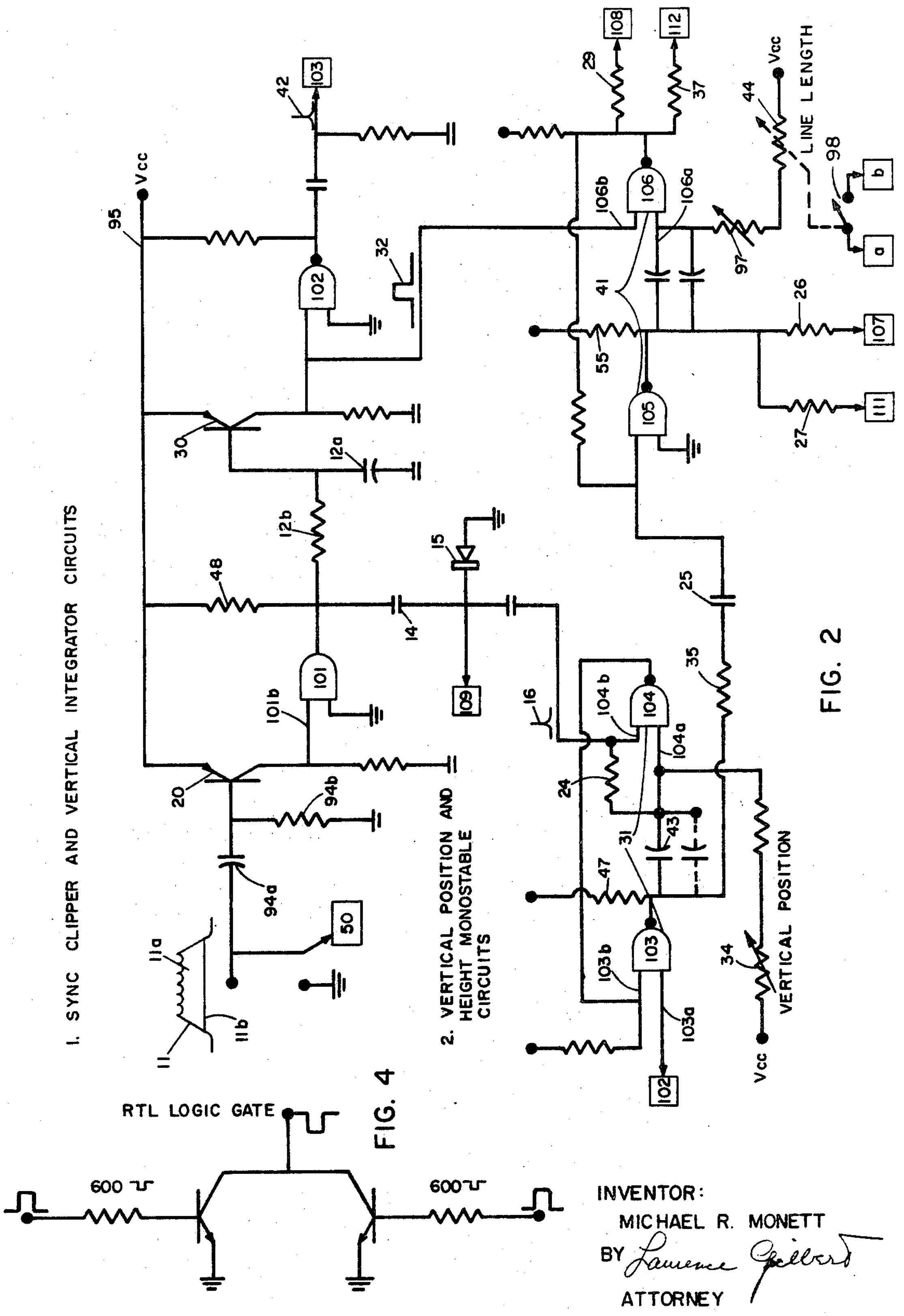
FIG. 2 is a circuit diagram of a resistor transistor logic gate which is used extensively in FIGS. 3 and 4 instead of separate transistors to conserve space.
FIG. 4 is a detailed circuit diagram of the slant line generator and horizontal gate circuit, the horizontal position and width monostable flip-flop circuits, and the output amplifier.
Figure 3:
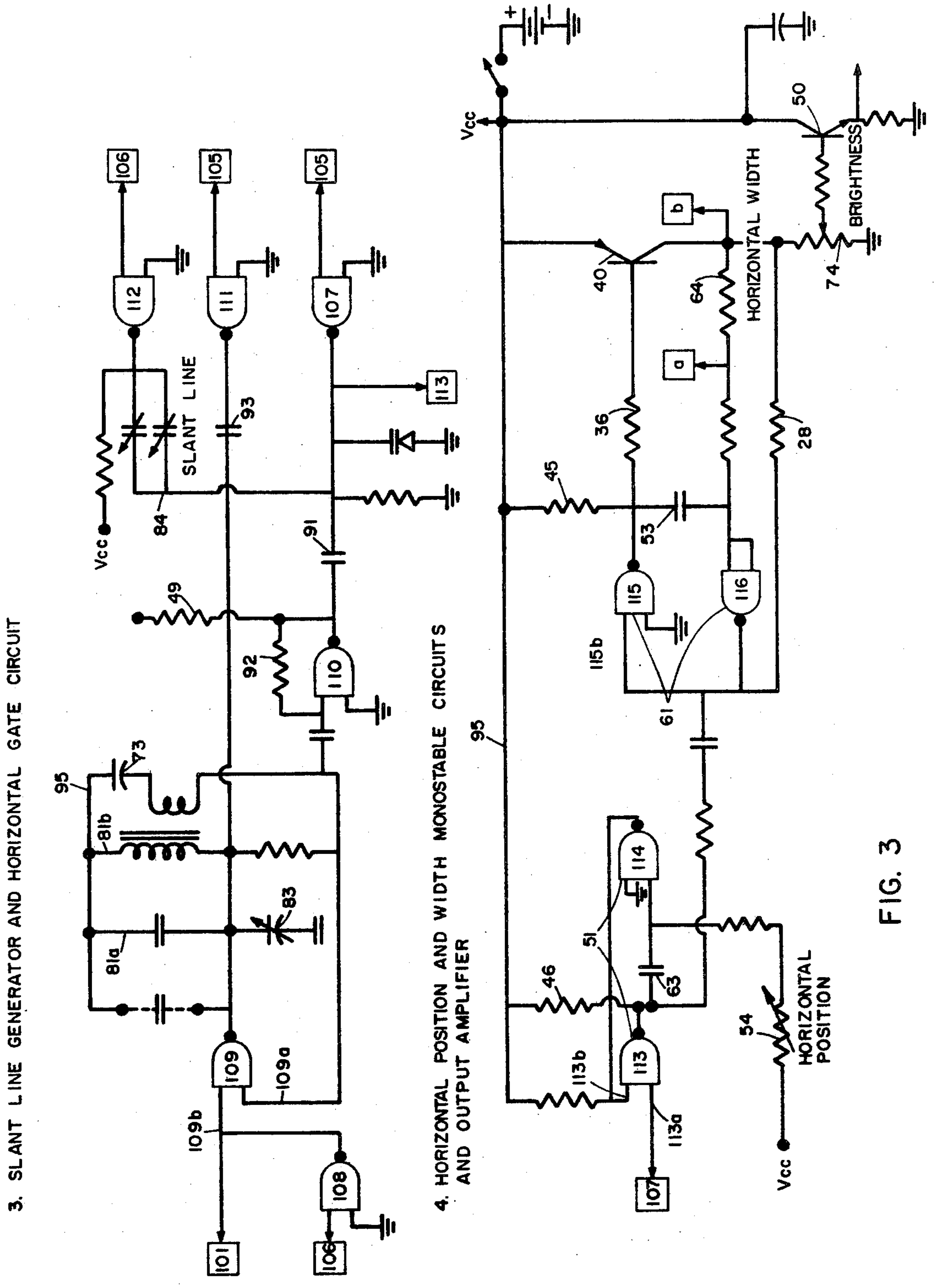
FIG. 3 is a detailed circuit diagram of the sync clipper and vertical integrator and the vertical position and height monostable flip-flop circuits.

Referring to FIGS. 2 and 3, PNP transistor 20 is connected to resistor transistor logic gate 101 to form a sync separator. Gates 101 to 116 are identical and shown in FIG. 4. The transistor 20 has its emitter connected to power supply 95 and its collector connected to **101*b* of gate 101. The output of gate 101 is connected to the base of PNP transistor 30 through integrators 12*a* and 12*b*, to 109*b* of gate 109 through differentiator 14, to 104*b* through differentiator 14, and to power supply 95 through resistor 48. Transistor 30 has its emitter connected to power supply 95 and its collector connected to the input of gate 102 and to 106*b* of gate 106. The output of gate 102 is connected to 103*a* of gate 103** through a differentiating circuit.

Gates 103 and 104 form monostable flip-flop circuit 31. The output of gate 103 is connected to power supply 95 through resistor 47. The RC network in the base of gate 104 provides a variable vertical delay of approximately 2 to 16 milliseconds. Input **104*b* to gate 104 is AC coupled to the input of gate 105. Gates 105 and 106 form a monostable flip-flop circuit 41 comprised of a variable vertical height delay in the base of gate 106 having a delay from zero to 16 milliseconds. The output of gate 105 is connected to gate 111 through resistor 27, to gate 107 through resistor 26, and to power supply 95 through resistor 55. The output of gate 106 is connected to gate 108 through resistor 29 and to gate 112 through resistor 37**.

The output of gate 108 to connected to input **109*b* of gate 109. The output of gate 107 is connected to the output of gate 110. The output of gate 111 is connected to capacitor 93. The output of gate 112 is connected to slant line control 84**.

The output of gate 109 is connected to oscillator 81 which is connected to gate 110 through an AC coupling capacitor. The output of gate 110 is connected to input **113*a* of gate 113, to the output of gate 107, and to power supply 95 through resistor 49**.

Gates 113 and 114 form a monostable flip-flop circuit 51 comprised of a variable horizontal position delay in the base of gate 114 having a delay from 5 to 60 microseconds. The output of gate 113 is connected to power supply 95 through resistor 46. The input to gate 114 is AC coupled to gate 115. Gates 115 and 116 form a monostable flip-flop circuit comprised of a variable horizontal width delay in the base of gate 116 having a delay from 0.1 to 2 microseconds. The output of gate 115 is connected to supply voltage 95 through a resistor 45 and to the base of the transistor 40 through resistor 36. Transistor 40 has its emitter connected to power supply 95 and its collector connected to brightness control 74. The output of brightness control 74 is connected to the base of transistor 50. Transistor 50 has its collector connected to power supply 95 and its emitter connected to the input of transistor 20.

OPERATION

In operation, composite signal 11 comprised of a positive-going video portion **11*a* and a negative-going horizontal synchronizing pulsed portion 11*b* is applied to the base of transistor 20. The positive-going video portion cuts off transistor 20 which conducts only during the horizontal retrace signal and the vertical blanking interval. RC network 94*a*, 94*b* ensures that transistor 20 will be self-adjusting to different amplitudes of composite signal 11. The sync pulses are inverted by transistor 20 and inverted again and amplified by resistor transistor logic gate 101 connected as an amplifier. The RTL logic gates, shown in FIG. 4 are resistor transistor logic circuits consisting of two inputs and one common output, with the output being the inverse of the input or inputs. They are used in FIGS. 3 and 4 as a convenient means of constructing the circuits. The sync pulses are differentiated by capacitor 14 and diode 15 to form sharp positive-going triggers 16 the leading edge of which are AC coupled to input 104*b* and gate 109. Diode 15 shunts the negative-going triggers to ground. Since the horizontal sync pulses trigger the lines on a TV monitor, positive-going triggers 16 occur at the start of each horizontal line. The average collector voltage of gate 101 is at the collector supply voltage 95 during the presence of horizontal sync pulses. This voltage is DC coupled by integrator 12a,12b to the base of transistor 30, to cut it off. The short time constant of integrator 12*a*,12*b* generates a large positive-going ripple which keeps transistor 30 off thereby preventing spurious signals generated during the duration of the frame from appearing on the collector of transistor 30. During the vertical blanking interval indicated by an absence of horizontal sync pulses, the average collector voltage at the output of gate 101 is clamped to ground turning transistor 30** on.

Hence, the positive transistion of output pulse 32 of transistor 30 signals the end of the frame. Gate 102 inverts and differentiates output pulse 32 to signal the start of the frame and to provide a positive-going trigger 42 for vertical position monostable circuit 31 consisting of gate 103 and gate 104.

With no input to input **103*a* of gate 103 gate 104 is turned on by current flowing through vertical position control 34, to input 104*a*. Gate 103 is turned on by frame start pulse 42 applied to input 103*a*. When the collector voltage of gate 103 is clamped to ground, timing capacitor 43 discharges through the resistor network in the base of gate 104*a* holding gate 104 off. Gate 103 is held on by the output of gate 104 to input 103*b* of gate 103. RC network in the base of gate 104, which can be varied by position control 34, determines how long gate 104 will be held off. Values are chosen to delay the time that gate 104 turns on from 2 to 16 milliseconds or nearly the duration of one frame. Capacitor 43 discharges to a level for a length of time determined by the setting of control 34, said level being coupled to input 104*b* through resistor 24. Positive triggers 16 also are coupled to input 104*b*. When the voltage sum of the charge on capacitor 43 and trigger 16 at input 104*b* is great enough to turn on gate 104, the vertical position monostable circuit terminates. Positive triggers 16 are prevented from triggering the vertical height monostable circuit 41 due to the attenuation provided by resistor 24 and the saturated gate 103. Once gate 104 is on, its collector is clamped to ground thereby removing the base current to input 103*b*, turning gate 103 off, and permitting the charge on timing capacitor 43 to return to its initial level. Current through resistor 34 keeps gate 104 turned on until the next frame start pulse triggers input 103*a***.

When gates 103 and 104 change state, which always will occur at the beginning of a line because the exact point at which the vertical delay terminates is controlled by trigger 16, a positive-going charging transient to provide a positive-going trigger for vertical height monostable circuit 41 is generated across resistor 47 and AC coupling capacitor 25 thereby turning gate 105 on. Resistor 35 attenuates any feedback from gate 105. Hence, when gate 104 is turned on, gate 105 is turned on.

Gate 106, which had been turned on by current flowing through line length control 44, is turned off when the collector voltage of gate 105 is clamped to ground. The RC network in the base of gate 106, which can be varied by line length control 44, determines how long gate 106 will be off. Values are chosen to delay the time period gate 106 turns on from zero to 16 milliseconds, or the duration of one frame. End-of-frame signal 32 ensures that gate 105 will be turned off and gate 106 will be turned on at the end of each frame to prevent interference with the blanking interval. During the period gate 104 is off, the collector voltage of gate 105 is at collector supply voltage 95. This voltage causes current to flow through resistor 26 to the base of gate 107 which acts as a switch. With an input to gate 107 the switch is closed thereby clamping pulses from gate 110 to ground.

When monostable circuit 41 changes state, the collector voltage of gate 105 is clamped to ground, hence no current flows to gate 107. With no input to gate 107, it becomes an open circuit which allows one pulse during each line from gate 110 to trigger horizontal position monostable circuit 51 at input 113*b* thereby turning gate 113 on. The length of time that line length control 44 keeps gate 106 off controls the number of pulses fed from gate 110 to gate 113 and also determines the length of time gate 113 receives pulses.

With no input to gate 113, gate 114 is turned on by current flowing through horizontal position control 54. Gate 113 is triggered at the beginning of each line of pulses from gate 110 during the time line length control 44 keeps gate 105 on. When gate 113 conducts, timing capacitor 63 discharges through the resistor network in the base of gate 114, holding it off. Gate 113 is held on by the output of gate 114 to input 113*b* of gate 113. The RC network in the base of gate 114, which can be varied by position control 54, determines how long gate 114 will be off. Values are chosen to delay the time period gate 113 turns on from 5 to 60 microseconds or the duration of one line. Gate 105 controls the triggers to gate 113.

The initial state of monostable circuits 31, 41 and 51 is established by current flowing through resistors to turn on gates 104, 106, and 114 respectively. The known state of monostables 31, 41 and 51 is established by trigger pulses turning on gates 103, 105, and 113 respectively. However, in the case of monostable 61, the initial state is such that gates 115, 116, and transistor 40 are off. The known state of monostable 61 is established by a trigger pulse turning on gate 115 which, in turn, turns on transistor 40.

AFter a variable period determined by position control 54, gate 114 will change state causing a transient spike to be AC coupled to horizontal width monostable 61 at input 115*b* thereby turning gate 115 on. When input 115*b* is triggered, the collector voltage of gate 115 is clamped to ground causing a voltage drop to develop across resistor 36 in the base of transistor 40, thereby turning it on. When transistor 40 is turned on, the top end of brightness control 74 goes to supply voltage 95, a portion of which is tapped off and fed to transistor 50. The base of transistor 50, which was at ground potential prior to the input from brightness control 74, is raised to some potential above ground. The output of transistor 50, which is an emitter follower, is fed back to the video amplifier of the TV monitor increasing its voltage which changes the bias on the TV monitor. The change in bias increases the brightness of the phosphor at that point in time, which generates a brightened segment of a line on the TV monitor.

Simultaneously with turning on transistor 50, gate 115 is held on by collector supply voltage 95 through transistor 40 and resistor 28 to input 115*b*. The transient pulse developed when monostable 61 changes state is AC coupled to gate 116 holding it off. Gate 116 is held off until current charging up through horizontal width control 64 to the top of brightness control 74 turns gate 116 on. Values are chosen to delay the time period gate 116 is held off from 0.1 to 2 microseconds.

When gate 116 turns on, gate 115 is turned off allowing its collector voltage to rise exponentially towards the supply voltage. Transistor 40 is held on until capacitor 53 in the base of gate 116 is almost fully recharged, whereupon transistor 40 turns off at a rate controlled by capacitor 53 and resistors 45 and 36 in the output of gate 115. Until transistor 40 cuts off, gate 116 is held on which in turn holds off gate 115.

With transistor 40 cut off, the voltage across brightness control 74 drops to zero which cuts transistor 50 and gate 116 off. The base of transistor 50 is returned to ground potential decreasing the brightness of the phosphor to its former level.

When a line is not being generated, that is, when gate 105 is off, the oscillator 81*a*81*b* in the output of horizontal gate 109 is locked to horizontal sync positive-going triggers 16. Gate 109 is triggered by positive feedback to input 109*b* to keep oscillator 81 locked to the frequency and phase of the incoming horizontal sync triggers 16. Variable capacitor 83 sets the frequency of oscillator 81*a*, 81*b* to the frequency of the TV monitor.

However, when gate 105 is on, which allows pulses to be applied to gate 113, current flows through resistor 36 to the base of gate 108 turning it on. When gate 108 is conducting, positive-going triggers 16 to the input of gate 109 are clamped to ground. With triggers 16 clamped to ground, oscillator 81*a*, 81*b* is allowed to free-run. With gate 105 on, no current flows through resistor 27 to gate 111, turning it off; concurrently gate 106 is off which allows current to flow through resistor 37 to gate 112, turning it on. With the output of gate 112 clamped to ground, slant control 84 is shunted across the tank circuit of oscillator 81 which allows the frequency of the free-running oscillator to be varied. Alternatively, with gate 105 off, capacitor 93 is shunted across the tank circuit which is locked to the frequency of the oscillator in the TV monitor.

A spike is generated at the peak of the sine wave generated by oscillator 81*a*, 81*b* through the action of the low value of by-pass capacitor 73. The negative-going transistion of the notch or spike is AC coupled to gate 110, which had been on by virtue of current flowing through resistor 92, to cut it off. When the collector voltage of gate 110 goes positive, a transient pulse is generated which is AC coupled to gate 113 when gate 107 is open.

The initial pulse across capacitor 91 is synchronized to positive triggers 16 which occur at the beginning of each line, but all subsequent pulses occur in time governed by the free-running oscillator. This is necessarily so because the last trigger 16 must also turn on gate 104, gate 105, and gate 112. If slant control 84 is set at the zero-offset position, free-running oscillator runs at the frequency of the oscillator in the TV monitor thereby generating a dot at the same point in time in each succeeding line, or a straight line. However, if slant control 84 is varied to lead or lag the frequency of the oscillator in the TV monitor, pulses are generated in each succeeding line that are advancing or receding in time with the first trigger pulse thereby generating a slanted line.

A convenient way of switching between a rectangle or diamond and a line is accomplished by having a switch 98 mounted on the line length control 44. Switch 98 is arranged to short out horizontal width control 64 when a line is desired. When a rectangle or diamond shape is required, turning line length control 44 completely counterclockwise opens switch 98, allowing the setting of horizontal width control 64 to adjust the width of the diamond or rectangle. The adjustable resistor 97 sets the height of the diamond or rectangle.

A convenient way of positioning the line, rectangle, or diamond in the X—Y plane is accomplished by a miniature gear-driven joystick arranged so that it operates vertical position control 34 and horizontal position control 54. The resistor values for these controls are selected, in so far as is possible, to produce equal motions in both the vertical and horizontal directions for corresponding movements of the joystick.

In order to thoroughly describe the present invention and make it possible for one skilled in the art to readily put it into practice, the following exemplary types and values of the components shows in FIGS. 2 and 3 are given. It is to be understood, of course, that these types and values are only exemplary, and the invention is not to be considered in any way limited by the presentation thereof.

| | |
|---|---|
| Transistors 20,30,40 | Type 2N4122 |
| Transistor 40 | Type 2N3646 |
| Gates 101 to 116 | Type motorola MC885P decal input quad expander integrated circuits |

| | |
|---|---|
| Diode 15 | 1N68 |
| Voltage source 95 | 3.0 volts (2 pen-light batteries) |
| Capacitors 14,25 | 470 picofarads |
| 91 | 220 picofarads |
| 12a | .01 microfarads |
| 43 | .33 microfarads |
| 83 | 200 picofarads |
| 84 | 400 picofarads |
| 73 | .0056 microfarads |
| 63 | .0022 microfarads |
| 81a | .0047 microfarads |
| 93,53 | 100 picofarads |
| 94a | .1 microfarads |
| Resistors 48,49,45 | 2200 ohms |
| 36 | 4200 ohms |
| 24 | 22,000 ohms |
| 46 | 420 |
| 35 | 2700 |
| Resistors 12b,26,27,28,29,37 | 10,000 |
| 34,92 | 100,000 |
| Resistors 47,55 | 1,000 |
| 74 | 500 |
| Resistors 44,54,64 | 33,000 |
| Resistor 94b | 330,000 |
| 97 | 10,000 |
| Coil 81b | 19.8 millihenry |
| Power consumption | 6 ma varies with control settings, but does not exceed 12 ma |
| External controls | joystick for X–Y positioning; variable capacitor for angle of line; variable potentimeter for length of line. Switches to rectangle when length is minimum. on-off switch. |
| Internal controls | brightness of line; height of rectangle (same as minimum line length); width of rectangle; frequency vernier. |

It is to be understood in connection with this invention that the embodiments shown are only exemplary, and that various modifications can be made in construction and arrangement within the scope of the invention as defined in the appended claims.

I claim as my invention:

1. Apparatus for superimposing a line, rectangle, or diamond shape on a video picture including a composite signal having horizontal sync pulses and a frame which includes a vertical blanking interval comprising:

a. means for generating line start pulses for each line of said frame, said means being responsive to said horizontal sync pulses;

b. means for generating a frame start pulse, said frame start pulse generating means being responsive to the vertical blanking interval of the composite signal;

c. means responsive to said frame start pulse for selecting a predetermined one of said line start pulses generated after the first line start pulse;

d. means responsive to said selected line start pulse for providing a predetermined number of intensifying pulses each of whose time of occurence after each line start pulse may be different;

e. means for controlling said time of occurence of said intensifying pulses by delaying each of said predetermined number of intensifying pulses for a controlled time after a line start pulse in response to a manually controlled change in a component of said control meanS;

f. meanS for determining the length of each of the intensifying pulses in response to a manually controlled change in a component of said length determining means, g. means responsive to said intensifying pulses for providing output pulses having a controlled rate of change on the trailing edge of each of said predetermined number of intensifying pulses; and h. means for providing said predetermined number of said output pulses to said composite video picture signal to form a slanted line, rectangle or diamond shape on said video picture, i. and means responsive to the vertical blanking interval of the composite signal for generating an end-of-frame signal provided to said means for providing a predetermined number of intensifying pulses in order to terminate the number of said predetermined number of intensifying pulses generated after said selected line start pulse to prevent said intensifying pulses from occurring during the vertical blanking interval of said frame.

2. Apparatus for superimposing a line, rectangle, or diamond shape on a video picture including a composite signal having horizontal sync pulses and a frame which includes a vertical blanking interval comprising:

a. means for generating line start pulses for each line of said frame, said means being responsive to said horizontal sync pulses;

b. means for generating a frame start pulse said frame start pulse generating means being responsive to the vertical blanking interval of the composite signal;

c. means responsive to said start pulse for selecting a predetermined one of said line start pulses generated after the first line start pulse;

d. means responsive to said selected line start pulse for providing a predetermined number of intensifying pulses each of whose time of occurrence after each line start pulse may be different;

e. means for controlling said time of occurrence of said intensifying pulses by delaying each of said predetermined number of intensifying pulses for a controlled time after a line start pulse in response to a manually controlled change in a component of said control means;

f. means for determining the length of each of the intensifying pulses in response to a manually controlled change in a component of said length determininG means, g. means responsive to said intensifying pulses for providing output pulses having a controlled rate of change on the trailing edge of each of said predetermined number of intensifying pulses; and h. means for providing said predetermined number of said output pulses to said composite video picture signal to form a slanted line, rectangle or diamond shape on said video picture, i. and wherein said means for selecting any one of said line start pulses generated after the first line pulse comprises;

j. a first monostable circuit connected to said means for generating said frame start pulse; said first monostable circuit being responsive to said frame start pulse to trigger said first monostable circuit to a known state;

k. means for determining the time said first monostable circuit is held in said known state by a manually adjustable control;

l. means for reverting said first monostable circuit from said known state to its initial state, said reverting means providing a positive-going charging transient, said transient being coincident with the first line start pulse occurring after said first monostable circuit reverts to its initial state and wherein said means for gating a predetermined number of pulses generated after said selected line start pulse comprises:

m. oscillating means locked to the frequency of said line start pulses;

n. a second monostable circuit connected to said first monostable circuit, said second monostable circuit being res-ponsive to said selected line start pulse to trigger said second monostable circuit to a known state;

o. means for establishing the initial state of said second monostable circuit;

p. means for selecting a predetermined time said second monostable curcuit is held in said known state, said predetermined time period being within the time to traverse said frame;

q. means for unlocking said oscillating means from the line start pulse frequency thereby allowing said oscillating means to be free-running;

r. means for amplifying said unlocked oscillating means;

s. means for gating said amplified unlocked oscillating means during said predetermined time period said second mono-stable circuit is held in said known state; and t. means for reverting said second monostable circuit from said known state to said initial state thereby terminating said means for gating said amplified unlocked oscillating means.

3. Apparatus, as recited in claim 2, wherein the means for delaying said predetermined number of pulses for a variable period of time within the time to traverse said line comprises:

a. a third monostable circuit connected to said means for gating said amplified unlocked oscillating means, said third monostable circuit being responsive to said predetermined number of pulses, said third monostable circuit being triggered to a known state by each of said predetermined pulses;

b. means for establishing the initial state of said third monostable circuit;

c. means for selecting a predetermined time period said third monostable circuit is held in said known state, said predetermined time period being within the time to traverse said line; and d. means for reverting said third monostable circuit from said known state to said initial state, said reverting means providing a positive-going charging transient, said transient being coincident with the end of said predetermined time period of said third monostable circuit.

4 Apparatus, as recited in claim 3, wherein the means for terminating said predetermined number of pulses after a variable period of time corresponding to a segment of a line comprises:

a. a fourth monostable circuit including a switch, connected to said third monostable circuit, said fourth monostable circuit being responsive to said predetermined number of pulses to trigger said fourth monostable circuit to a known state;

b. said switch establishing the initial state of said fourth monostable circuit;

c. means for selecting a predetermined time period said fourth monostable circuit is held in said known state, said predetermined time period corresponding to a segment of said line; and d. means for reverting said fourth monostable circuit from said known state to said initial state, thereby terminating said predetermined number of pulses.

5 Apparatus, as recited in claim 4, wherein said means for developing a ramp having a controlled rate on the trailing edge of said predetermined number of pulses comprises:

a. means for amplifying said predetermined number of pulses, and b. a resistor capacitor network in the base of said means for amplifying said predetermined number of pulses, said network controlling the voltage output of said predetermined number of pulses, said voltage output having a controlled exponential rise.

6. Apparatus, as recited in claim 5, wherein said means for feeding back said predetermined number of pulses having said ramp to said video picture to form a line, rectangle, or diamond shape thereon comprises:

a. means for retaining the shape of said predetermined number of pulses having said ramp, the output of said retaining means being connected to the input of said means for generating line start pulses for each line of a frame; and b. means for controlling the voltage level of said pre-determined number of pulses.

7 Apparatus, as recited in claim 1, wherein said means for generating an end-of-frame signal to terminate said pre-determined number of pulses generated after said selected line start pulse thereby preventing interference with said vertical blanking interval of said frame comprises:

a. integrating means responsive to a change in said line start pulses within a time period corresponding to approximately one-third the time to traverse said line; and b. means responsive to the negative transition of said integrating means, said negative transition being coincident with the start of said blanking interval to signal the end of the frame.

8. Apparatus, as recited in claim 7, wherein said means for generating a frame start pulse comprises integrating means responsive to the blanking interval of the video signal to produce a positive transition signal from said video signal and means responsive to the positive transition to produce said frame start pulse, said frame start pulse being coincident with the end of said blanking interval to signal the start of the frame.

* * * * *